(No Model.)
W. & J. E. GLEASON.
AUTOMATIC GEAR PLANER.
No. 518,497.
Patented Apr. 17, 1894.
7 Sheets—Sheet 3.
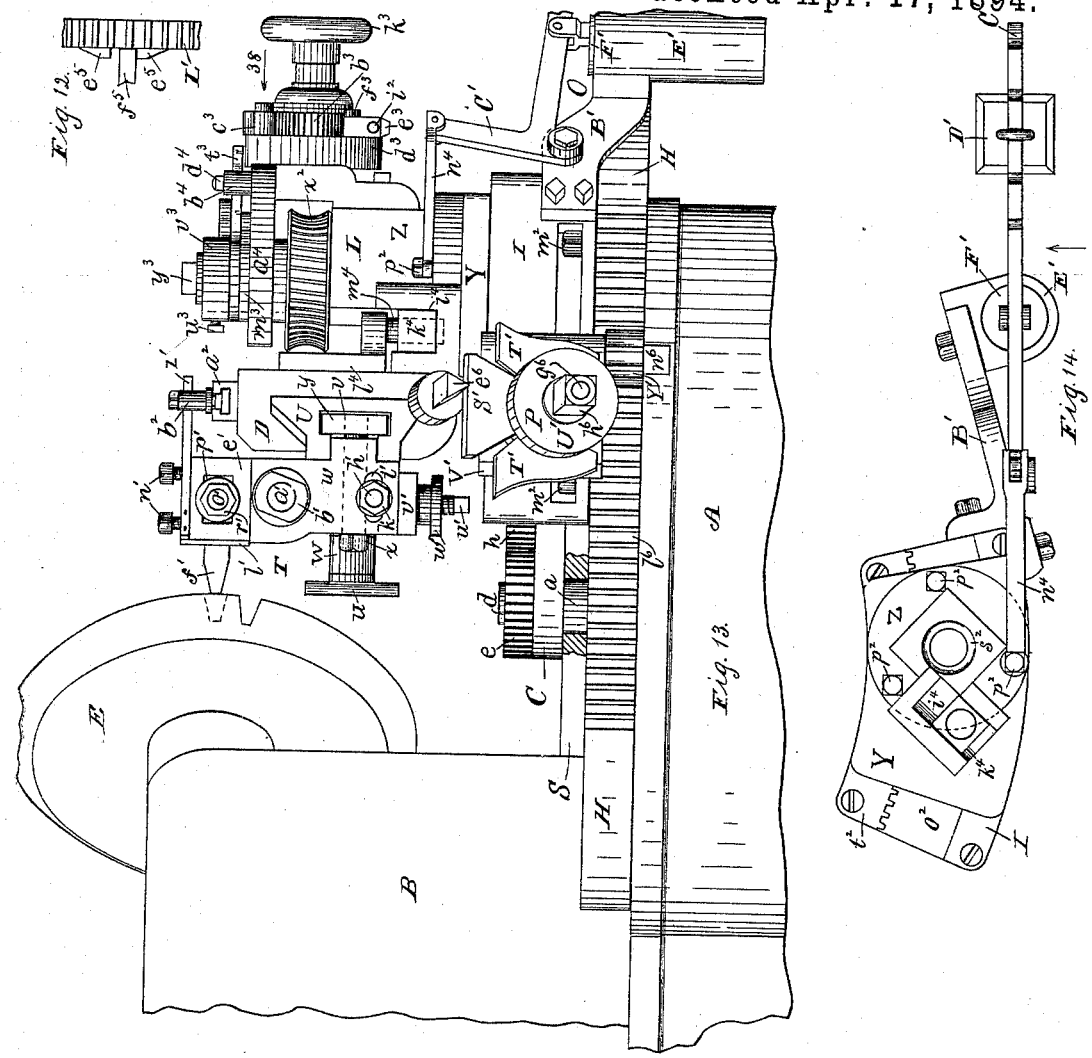
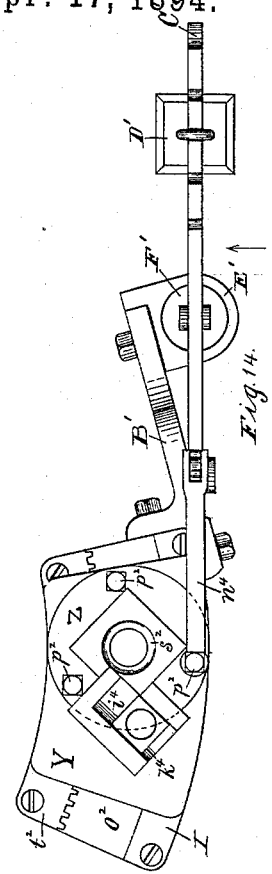
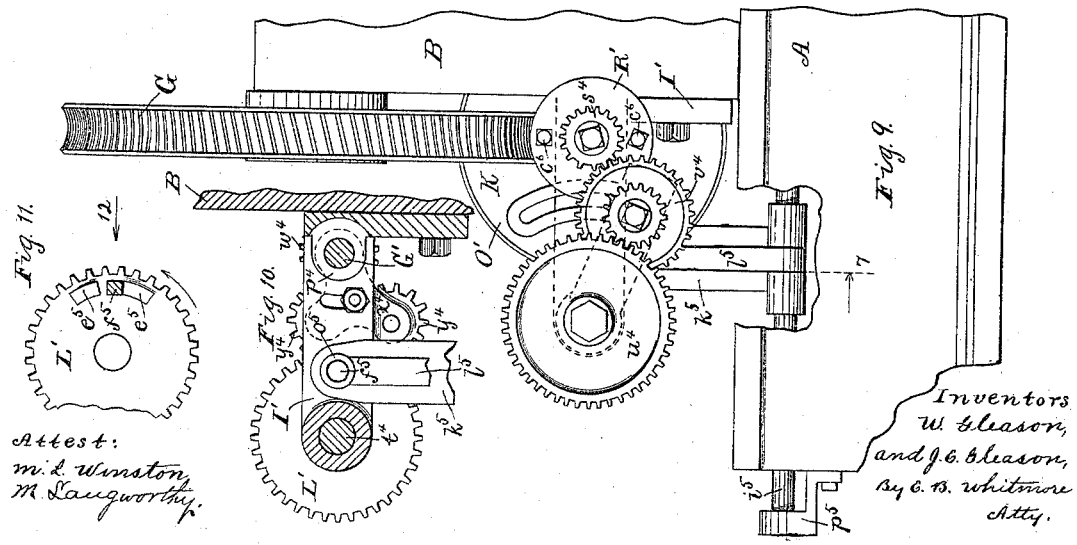
Attest:
M. L. Winston
M. Langworthy
Inventors
W. Gleason,
and J. E. Gleason,
By C. B. Whitmore
Atty.
THE NATIONAL LITHOGRAPHING COMPANY,
WASHINGTON, D. C.

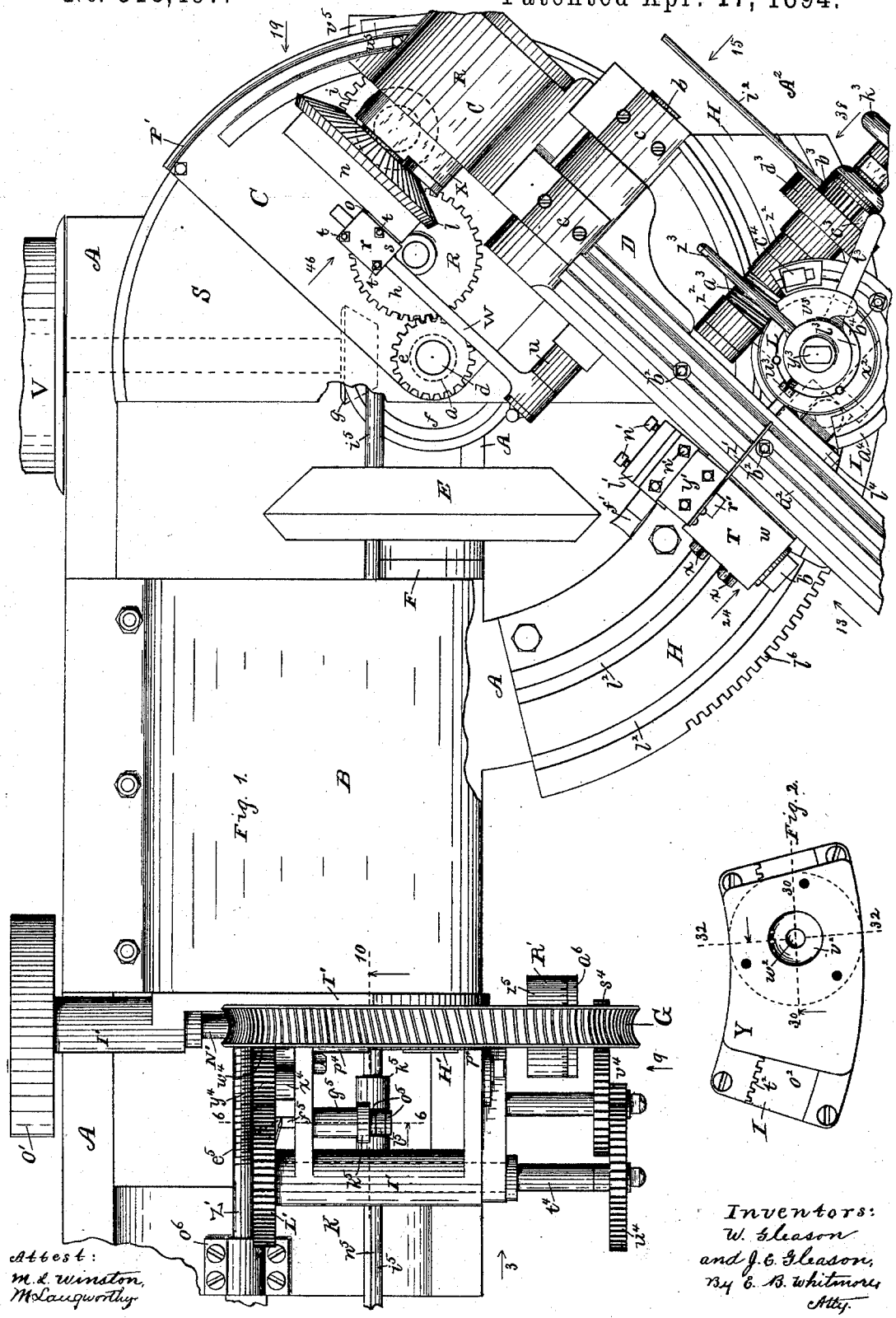

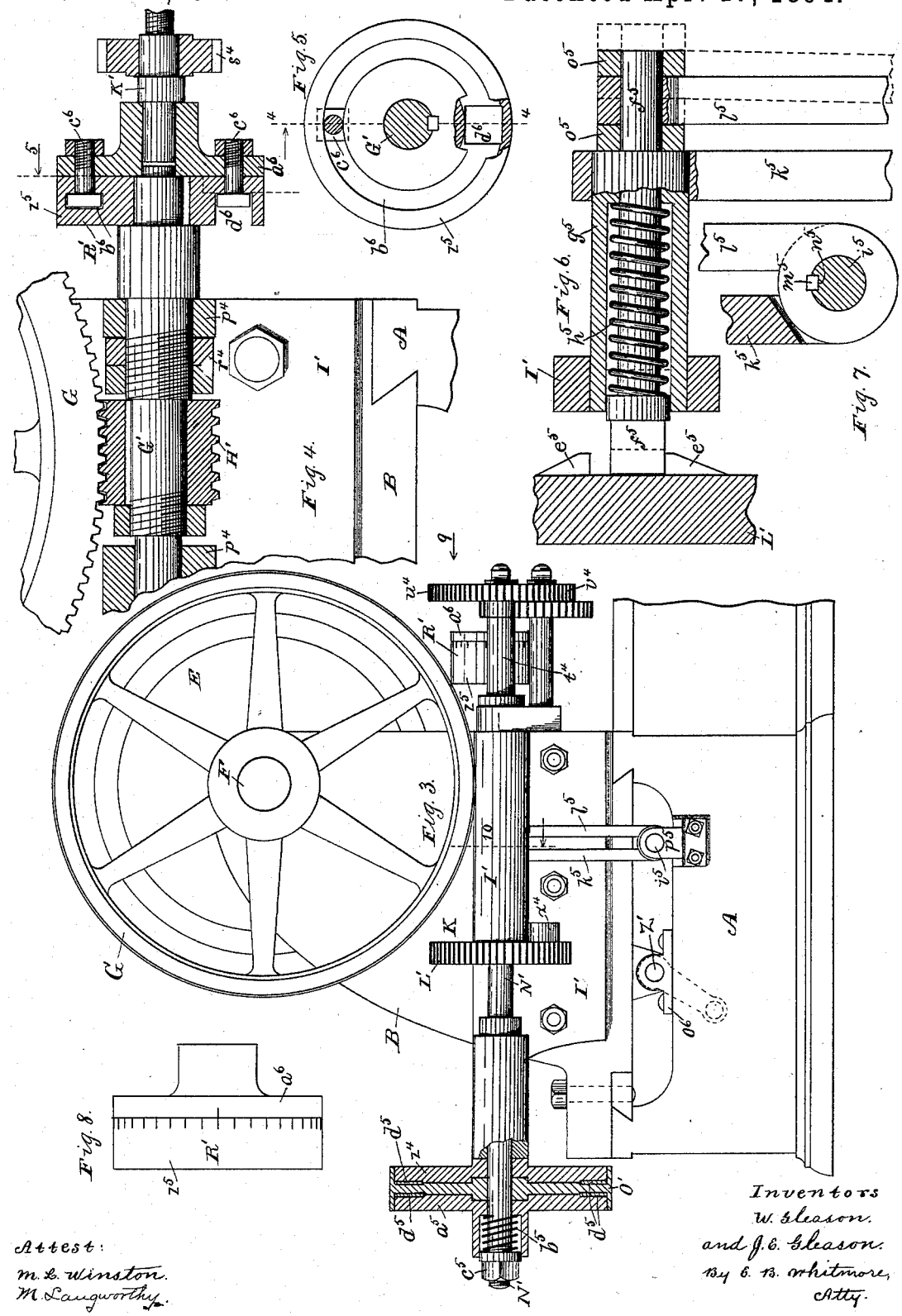

(No Model.) 7 Sheets—Sheet 4.
W. & J. E. GLEASON.
AUTOMATIC GEAR PLANER.
No. 518,497. Patented Apr. 17, 1894.
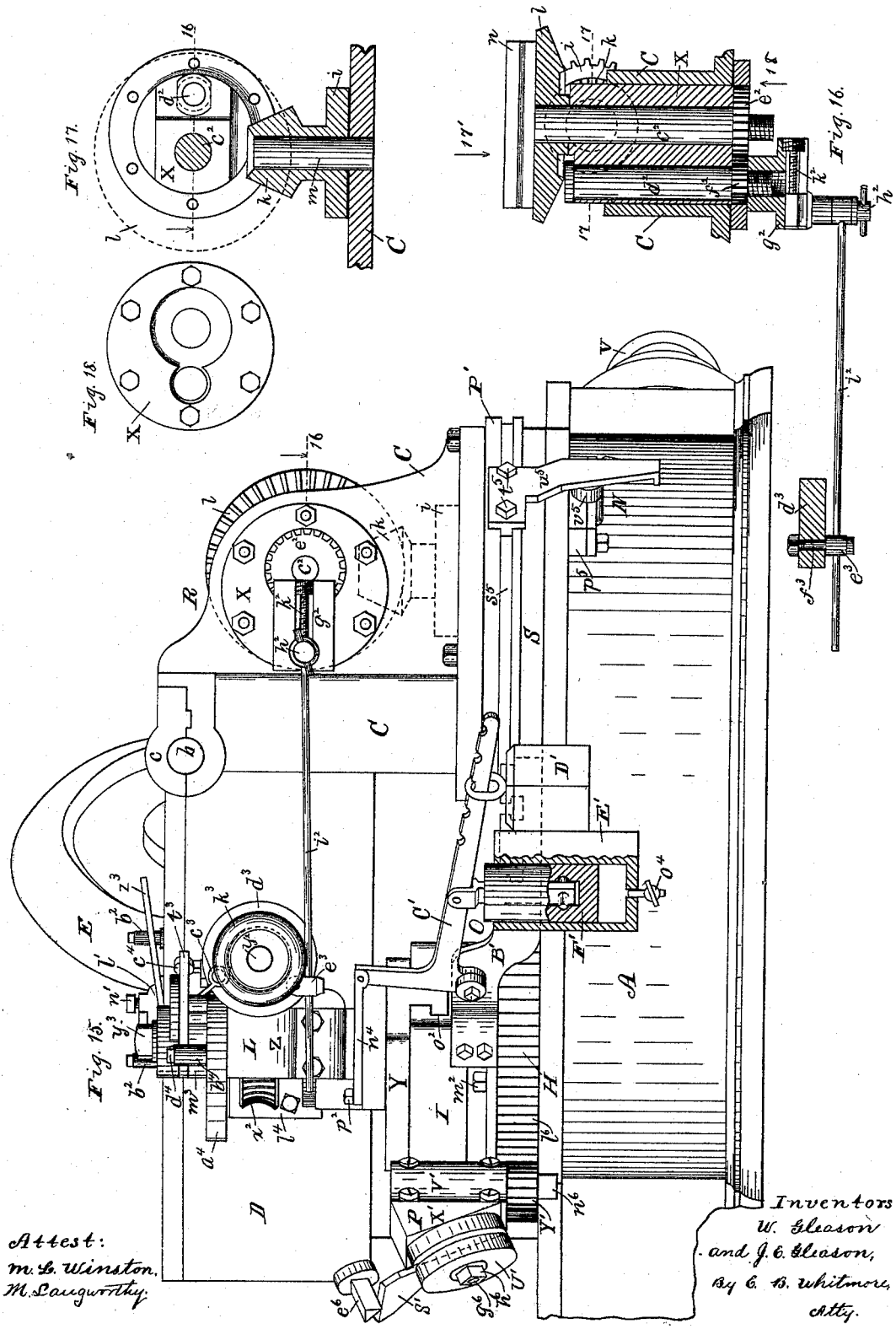
Attest:
M. L. Winston.
M. Langworthy.
Inventors
W. Gleason
and J. E. Gleason,
By C. B. Whitmore,
Atty.

(No Model.) 7 Sheets—Sheet 5.
W. & J. E. GLEASON.
AUTOMATIC GEAR PLANER.
No. 518,497. Patented Apr. 17, 1894.
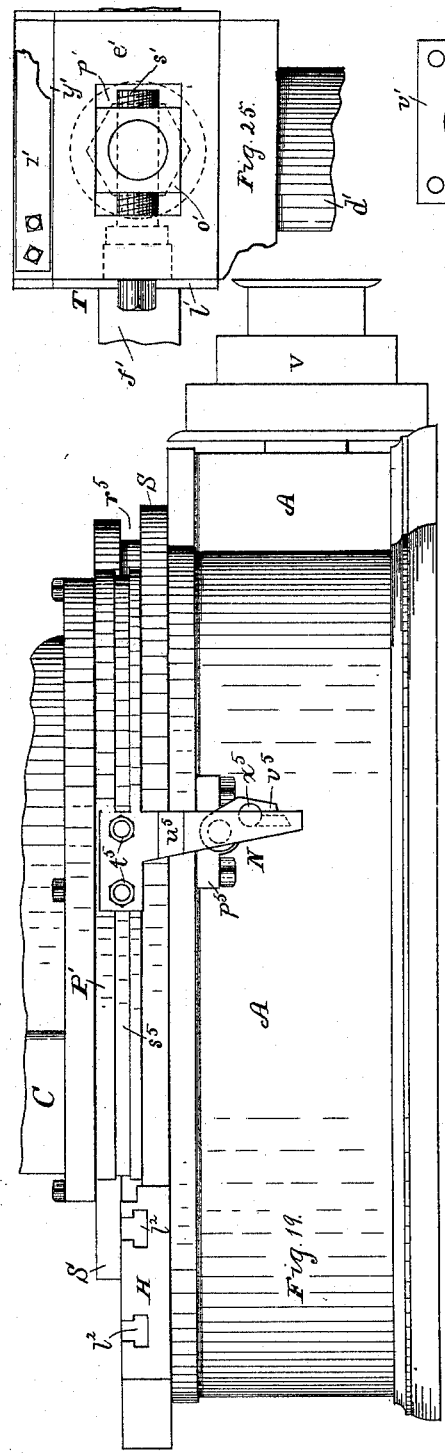
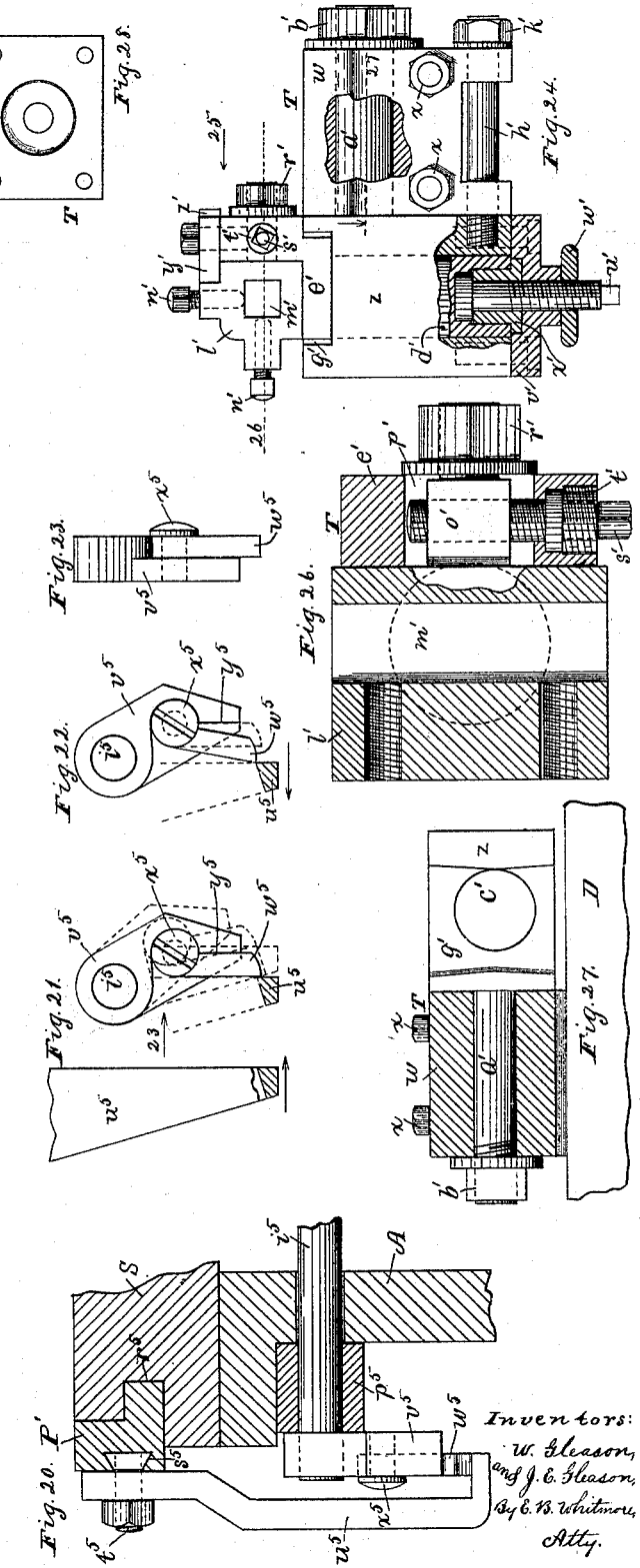
Attest:
M. L. Winston.
M. Langworthy.
Inventors:
W. Gleason,
and J. E. Gleason,
By E. B. Whitmore,
Atty.

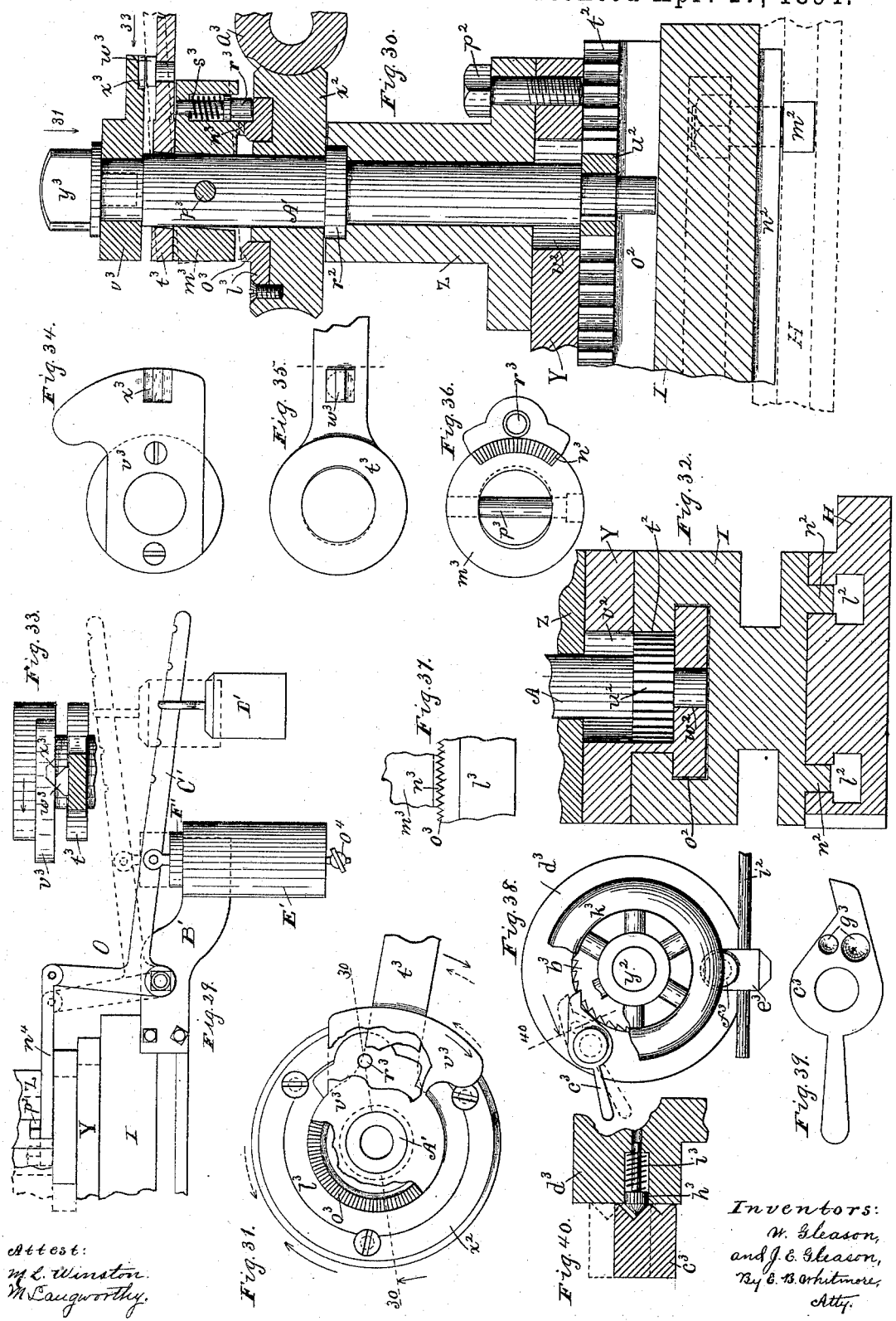

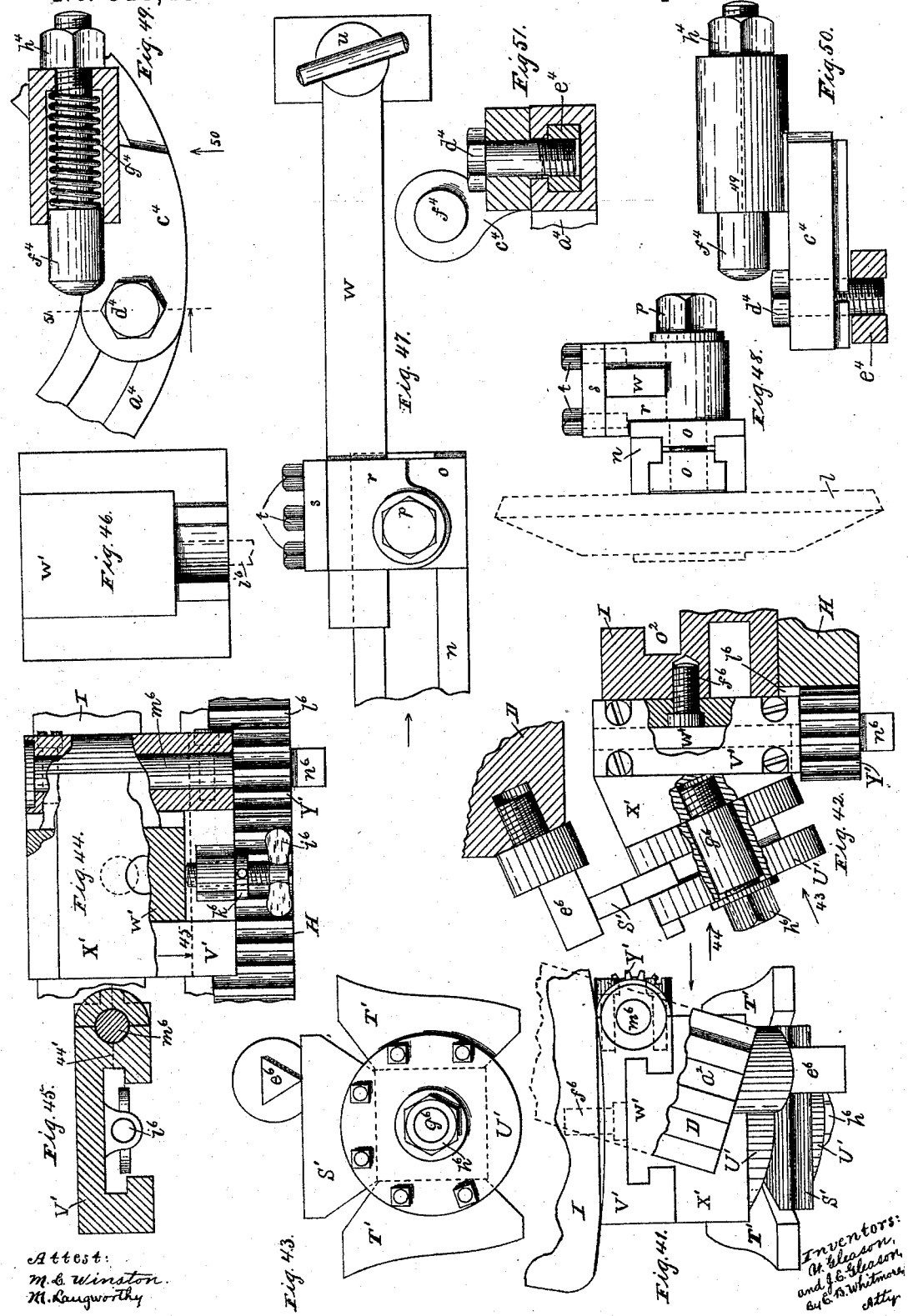

UNITED STATES PATENT OFFICE.

WILLIAM GLEASON AND JAMES E. GLEASON, OF ROCHESTER, NEW YORK.

AUTOMATIC GEAR-PLANER.

SPECIFICATION forming part of Letters Patent No. 518,497, dated April 17, 1894.

Application filed November 24, 1893. Serial No. 491,852. (No model.)

*To all whom it may concern:*

Be it known that we, WILLIAM GLEASON and JAMES E. GLEASON, of Rochester, in the county of Monroe and State of New York, have invented a new and useful Improvement in Automatic Gear-Planers, which improvement is fully set forth in the following specification, and shown in the accompanying drawings.

This invention relates to that class of gear cutting or forming machines in which the teeth of the gears to be cut are planed out and shaped or formed by means of reciprocating tools so controlled as to move always in lines radial with a common fixed point. Medium or small sized gears are usually formed in these machines from solid blanks by first rough-cutting away the metal to form the spaces between the teeth the latter being finally gone over with finishing tools to give their working faces the proper incline and curvature.

The main object of our present invention is to construct a complete automatic gear planer by means of which when a blank is put into the machine to have teeth formed upon it the machine being provided with the proper cutting tool and properly adjusted and started will cut entirely around the blank without further attention by the operator. To accomplish this the following operations have to be performed in succession with each tool employed, viz: First the reciprocating tool (the roughing tool for instance) has to be fed against the work; second the feed thrown off when a space is cut to a prearranged depth; third the tool (continuously reciprocating) moved back clear from the blank; fourth the latter indexed, and, fifth, the feed again thrown in. All these general operations are repeated in the order named for each space or groove cut in the face of the blank, the operator only needing to be present in time to stop the machine after the spaces have been cut entirely around. The finishing tools to give the proper form to the two faces of the teeth are afterward substituted successively for the roughing tool, the machine working automatically in each case and going through the same succession and order of operations with each of these tools as with the roughing tool.

The attention of the operator during the whole process of forming and completing the teeth of a gear is necessary only to start and stop the machine each time around the blank and put in place the proper tool for the work and make the necessary changes and adjustments of the machine.

Our invention further comprises numerous features of novelty relating to form, combination and operation of the parts, the whole being hereinafter fully described and more particularly pointed out.

Referring to the drawings, Figure 1 is a general plan of the gear planer, parts being broken away and omitted. Fig. 2 is a plan of parts at the base of the feed mechanism. Fig. 3 is an end view of the machine, seen as indicated by arrow 3 in Fig. 1, showing the general indexing mechanism, the friction pulley being diametrically sectioned. Fig. 4 shows more clearly some of the essential parts of the indexing mechanism, parts being vertically sectioned on a plane corresponding with the axis of the worm, or as upon the dotted line 4 4 in Fig. 5. Fig. 5 is a face view of a part of the adjusting cylinder, seen as indicated by arrow 5 in Fig. 4, parts being broken away and transversely sectioned as on the dotted line at the point of said arrow 5. Fig. 6 shows the essential parts of the detent for the indexing mechanism, mainly vertically sectioned as on the dotted line 6 6 in Fig. 1, parts being shown in two positions by full and dotted lines. Fig. 7 shows a transverse section on the dotted line 7 in Fig. 9, of the trip shaft and portions of the associated parts. Fig. 8 is a side elevation of the graduated adjusting cylinder of the indexing mechanism. Fig. 9 is a side elevation of portions of the indexing mechanism, seen as indicated by arrows 9 in Figs. 1 and 3, parts being broken away. Fig. 10 is a vertical transverse section of parts of the indexing mechanism taken on the dotted lines 10 in Figs. 1 and 3, parts being broken away and omitted. Fig. 11 is a side view of the detent gear, showing the rigid stops, viewed the same as Fig. 10. Fig. 12 is an edge view of a portion of the detent gear, seen as indicated by arrow 12 in Fig. 11. Fig. 13 is a side elevation of parts at the front of the machine, seen as indicated by arrow 13 in Fig. 1. Fig. 14 is a plan of parts of the feed and the pull-back mechanism. Fig. 15 is a side elevation of parts at the front of the machine, seen as indicated by arrow 15 in Fig. 1, parts being omitted. Fig. 16 is a horizontal section of a part of the turret showing some of the driving mechanism for the feed, taken on the dotted lines 16 in Figs. 15 and 17. Fig. 17 is a view of parts driving the feed, indicated by arrow 17' in Fig. 16, parts being omitted and other parts being vertically sectioned on the dotted line 17 17 in said latter figure. Fig. 18 shows the head of the plug, seen as indicated by arrow 18 in Fig. 16. Fig. 19 is a front end view of the frame and other parts seen as indicated by arrow 19 in Fig. 1, better showing the trip mechanism. Fig. 20 is a side view of parts of the trip mechanism, portions being vertically sectioned along the axis of the trip shaft. Figs. 21 to 23 show in detail the construction and operation of parts of the trip mechanism the last figure being a view indicated by arrow 23 in Fig. 21. Fig. 24 is a front elevation of the tool-stock and tool holder, seen as indicated by arrow 24 in Fig. 1, parts being broken away and vertically sectioned. Fig. 25 is an elevation of parts of the tool-stock seen as indicated by arrow 25 in Fig. 24. Fig. 26 shows the tool holder and other parts horizontally sectioned on the dotted line 26 in Fig. 24. Fig. 27 shows the tilting head in plan, and the slide block horizontally sectioned on the dotted line 27 in Fig. 24. Fig. 28 is a plan of the bottom plate of the tilting head. Fig. 29 is a side elevation of the pull-back mechanism, viewed as indicated by arrow in Fig. 14, Sheet 3 parts being shown in two positions by full and dotted lines. Fig. 30 is a vertical section of parts of the feed mechanism along the axis of the feed post, taken substantially on the dotted lines 30 30 in Figs. 2 and 31, parts being shown in two positions by full and dotted lines. Fig. 31 is a view on top of the feed post, indicated by arrow 31 in Fig. 30, parts being omitted and broken away. Fig. 32 is a vertical cross section of the base block and associated parts at the foot of the feed post, taken as on the dotted line 32 32 in Fig. 2. Fig. 33 is a side elevation of parts at the upper end of the feed post, showing some of the feed-relief mechanism, viewed as indicated by arrow 33 in Fig. 30. Figs. 34, 35 and 36 show in detail some of the co-acting parts of the relief mechanism. Fig. 37 shows adjacent portions of the toothed rocker and the toothed ring in engagement. Fig. 38 is a side elevation of the feed pawl and ratchet with associated parts, seen as indicated by arrows 38 in Fig. 1, and Fig. 13, Sheet 3, parts being broken away and the pawl shown in two positions by full and dotted lines. Fig. 39 shows the inner face of the pawl. Fig. 40 shows a section through the axis of the detent for the pawl on the dotted line 40 in Fig. 38, indicated by arrow, the pawl being shown in two positions by full and dotted lines. Fig. 41 is a plan of parts under the extreme end of the tangent arm showing the form holder and associated parts. Fig. 42 is a side elevation of parts under the end of the tangent arm, seen as indicated by arrow in Fig. 41, parts being broken away and omitted and other parts vertically sectioned on various planes. Fig. 43 is a front elevation of the form holder, forms and form rider, seen as indicated by arrow 43 in Fig. 42. Fig. 44 is an elevation of the parts carrying the form holder, seen as indicated by arrow 44 in Fig. 42, parts being broken away and vertically sectioned as on the dotted line 44' in Fig. 45. Fig. 45 is a part holding the form holder and some other parts, horizontally sectioned as on the dotted line 45 in Fig. 44. Fig. 46 is a rear view of the slide carrying the form holder. Fig. 47 is a side elevation of the adjustable connecting bar for the tool-carrying slide, with associated parts, seen as indicated by arrow 46 in Fig. 1. Fig. 48 is a view of the connecting bar and associated parts, seen as indicated by arrow in Fig. 47. Fig. 49 is a plan of the buffer for the feed-relief lever, the spring barrel being horizontally sectioned as on the dotted line 49 in Fig. 50. Fig. 50 is a side elevation of the buffer, seen as indicated by arrow 50 in Fig. 49. Fig. 51 is a front elevation of the buffer, parts being transversely sectioned as on the dotted line 51 in Fig. 49.

Figs. 1, 2, 3, and 9 to 19 inclusive, and 24, 27, 28 and 29 are drawn to scales smaller, and Figs. 6, 7, 25, 26, 37, and 39 to 51 inclusive, are drawn to scales larger than that of the remaining figures.

Referring to the parts shown, A is the frame of the machine, B the head-stock, C the turret, and D the tangent arm, which parts are substantially like the corresponding parts shown in Patent No. 509,467 of November 28, 1893.

E is the blank gear to be cut, it being rigid with a horizontal spindle F, Figs. 1 and 3, resting in the head-stock.

G, Figs. 1, 3 and 9, is an indexing wheel with worm teeth, of common construction, rigid with the spindle F.

H, Figs. 1, 13, 15 and 19, is a horizontal circular segment made rigid with the circular part of the frame.

I, Figs. 1, 2, 13, 15 and 32, is a shiftable base block for the feed mechanism, resting upon the segment H.

The indexing mechanism is shown at K, Figs. 1, 3 and 9, and in detail in Figs. 4 to 7, Sheet 2, and 10 to 12, Sheet 3.

The feed mechanism is shown at L, Figs. 1, 13, and 15, and in detail in the figures in Sheet 6, and Figs. 49 to 51, Sheet 7.

The trip mechanism, which releases the indexing mechanism and allows it to move, is shown at N in Figs. 15 and 19, and in detail in Figs. 20 to 23.

The pull-back mechanism for swinging the tangent arm and the cutting tool back from the work after each operation in cutting a tooth is completed, is shown at O, Figs. 13, 14 and 15, and Fig. 29, Sheet 6.

The form-holding mechanism, and the means for shifting the tangent arm, base block and feed mechanism, are shown at P, Figs. 13 and 15, and in detail in Figs. 41 to 46, Sheet 7.

The mechanism for operating the tool and the feed mechanism is shown at R, Figs. 1 and 15, and in detail in Figs. 16 to 18, Sheet 4, and Figs. 47 and 48, Sheet 7.

The tool-holding mechanism is shown at T in Figs. 1 and 13, and in detail in Figs. 24 to 28, Sheet 5.

The frame of the machine is formed with a circular part at one end upon which rests concentrically a flat semi-circular bed-piece S, Figs. 1, 13, 15 and 19. This forms a base upon which the turret, C, rests and upon which the latter is adapted to swing in a horizontal plane around a vertical pivot $a$, Fig. 13. The axis of this pivot and the axis of the gear-carrying spindle F, are in a vertical plane. The tangent arm, D, rests at one end in horizontal pivotal bearings in the upper part of the turret in which it is adapted to swing through short distances in a vertical plane upon a horizontal pintle $b$, the axes of this pintle and of the pivot $a$ being in a vertical plane. The tool-holding mechanism is secured to and carried by a dove-tail slide, U, Fig. 13, fitted to slide longitudinally in a corresponding cavity in the tangent arm.

The pivot $a$, Figs. 1 and 13, for the turret C is hollow, and within it rests a concentric vertical shaft $d$, to the upper end of which is secured a spur pinion $e$ above the base of the turret, and to its lower end a bevel gear $f$. This gear is engaged by a bevel driving pinion $g$ secured to a horizontal driving shaft indicated by dotted lines in Fig. 1, to the outer end of which is secured an ordinary step pulley V, Figs. 1, 15 and 19, this construction being fully shown and described in the Letters Patent above mentioned.

*The tool-driving mechanism.*—Acting with the pinion $e$ is an intermediate gear $h$, Figs. 1 and 13, which turns a third gear $i$, Figs. 1, 15, 16 and 17, these three gears being in a horizontal plane. Rigid with the gear $i$ is a bevel pinion $k$ adapted to turn a bevel gear $l$, Figs. 1, 15, 16 and 17, and 48, Sheet 7, said pinion and gear, $k$ and $l$, turning upon a vertical stud $m$ rigid in the plate of the turret. The construction and arrangement of this train of gearing are also shown and described in said Patent No. 509,467. The gear $l$ is formed with a transverse slotted part $n$, adapted to hold a shiftable head $r$ by means of slides $o$ $o$, and stud $p$, Figs. 1, 47 and 48. To the head $r$ is adjustably secured a bar W, Figs. 1, 13, 47 and 48, which is connected at the other end with the tool-carrying slide U by means of a stud $u$ rigid with the slide and upon which the connecting bar has a journal bearing. By means of this construction the tool-holding mechanism and the tool are reciprocated by the driving belt on the step pulley V.

In doing different kinds of work, it frequently becomes convenient to alter the length of the connecting bar and for this purpose we make it longitudinally adjustable in the head $r$. Referring to Figs. 47 and 48, it will appear that the bar rests in a channel or gain formed in the upper part of the head, which is covered by a plate $s$ held to the head by clamping screws $t$, shown also in Fig. 1. By loosening these screws the connecting bar may be shifted longitudinally in its bearing in the head and so move the slide U nearer to or farther from the head $r$.

*The tool-holding and controlling mechanism.*—The slide U is formed with a central longitudinal T-shaped groove $v$, Fig. 13, and the slide block $w$ of the tool-holding mechanism, Figs. 1, 13, 24 and 27, has a part extending into said groove, as shown. This slide block is held in place by horizontal clamping bolts $x$ $x$ passing through it and entering a sliding piece or block $y$ occupying the wide portion of the groove $v$. Associated with the slide block is a tilting head, $z$, formed with a stem $a'$ passing horizontally through the slide block $w$ and secured by a nut $b'$. This tilting head is formed with a vertical circular opening $c'$, Fig. 27, which is occupied by a stem $d'$ of the tool-stock $e'$, Figs. 13, 24, 25 and 26, said stem having a swivel motion in the tilting head. By means of these constructions the point of the tool, $f'$, Figs. 1 and 13, may be slightly tilted with reference to a horizontal, and slightly swung in a horizontal plane, both of which motions are necessary in the successful planing of gear teeth. The tilting head is formed with a recess $g'$, clearly shown in Figs. 24 and 27, in which the tool-stock rests. The vertical side walls of this recess are each formed with two-faces meeting each other in an obtuse angle at the middle, but the faces of the tool-stock opposing these respective walls are made straight. And as the part of the tool-stock in the recess does not wholly fill the latter the swivel motion of the tool-stock just mentioned is provided for. The slanting walls of the tilting head form stops to limit the swivel motion of the tool-stock in both directions. The tilting head is held in its tilted positions by means of a horizontal bolt $h'$, Figs. 13 and 24, rigid in said head and passing through curved slots $i'$ in the slide block $w$. These slots are concentric with the stem $a'$ of the tilting head, and a nut $k'$ is provided for holding the parts rigidly together when the head is tilted.

The tool-stock $e'$ serves to hold a longitudinally-adjusted tool holder $l'$, Figs. 1, 24, 25 and 26, formed with a horizontal rectangular cavity $m'$, in which the tool ($f'$) is accurately fitted. This tool holder is made to slide horizontally under a plate or gib $y'$, Figs. 1, 24 and 25, bolted to the tool-stock, and it is provided with vertical and horizontal binding screws $n'$ $n'$, for holding the tool rigidly in place. It is further formed with a shank $o'$, Figs. 25 and 26, extending laterally through a rectangular cavity $p'$ formed in the tool-stock, terminating in a threaded part for receiving a binding nut $r'$. The cavity is made longer horizontally than the width of the shank to admit of a horizontal motion of the tool holder for the purpose of adjusting the tool to the work. A traverse screw $s'$, Figs. 24, 25 and 26, is threaded in the shank $o'$, parallel with the cavity $m'$, by means of which to longitudinally adjust the tool. The traverse screw has a simple bearing in the tool-stock back of a hollow screw-plug $t'$, which admits of rotary, but prevents longitudinal, motion for the traverse screw.

The stem $d'$ of the tool-stock extends downward through the tilting head $z$, as appears in Fig. 24; and to move the tool vertically we employ a headed shaft $u'$, Figs. 13 and 24, threaded in a plate $v'$, (shown in plan in Fig. 28,) secured to the lower end of the tilting head by simple fastening screws shown in dotted lines in Fig. 24. The axes of the shaft and the stem $d'$ are in line and the shaft is provided with a set nut $w'$ below $v'$ to hold it firmly in place. The lower end of the stem is counter bored to receive the headed end of the shaft, and a hollow follower $x'$, is threaded into the stem to bear against and confine the head of the shaft, as shown. The lower end of the follower is formed with a projecting flange, and the plate $v'$ is counter bored on its inner face to receive the flange, as shown in Fig. 24. By means of this construction the tool-stock with the tool holder and the tool, may be moved vertically by turning shaft $u'$ one way or the other, while the tool-stock is permitted to turn freely in a horizontal direction upon the head of the shaft $u'$. The shaft $u'$ is squared at its lower end to receive a wrench for turning it.

The slight swinging of the tool-stock horizontally in its bearing in the tilting head is to cause the two cutting edges or points of the tool to be properly presented successively to the work as the direction of motion of the tool is changed. For this purpose the tool needs to be swung or shifted each time after a cut has been taken across the face of the gear in either direction. To effect this successive shifting of the tool a spring arm $z'$, Figs. 1 and 13, is made rigid with the tool-stock so as to extend out across the arm D. The latter is formed with a longitudinal T-shaped race $a^2$, in which are secured adjustable stop-studs $b^2$, which are set in positions to be encountered by the spring arm at each end of the stroke of the tool to turn the tool-stock in the tilting head as stated.

*The feed driving mechanism.*—The feed mechanism is operated by the following means: The shaft $c^2$, which is horizontal, of the bevel gear $l$, Figs. 1 and 15 to 18, Sheet 4, rests in a bearing in a horizontal cylindrical plug X fitted in a recess in the turret C. Parallel with shaft $c^2$ and in the same horizontal plane is a second shaft $d^2$, also resting in the plug, the two shafts being connected at one end by a gear $e^2$ and a pinion $f^2$, two to one in diameter. By this means the shaft $c^2$ turns the shaft $d^2$. The plug X is formed with an overhanging flange through which bolts pass to secure the plug rigidly to the turret. The outer face of the head of the plug is counter bored, as shown in Figs. 15 and 18, in which to receive the gear $e^2$ and pinion $f^2$ flush with its surface. The shafts $c^2$ and $d^2$ terminate in equal overhanging threaded ends, to which is fitted an interchangeable grooved hub $g^2$. This hub carries a shiftable stud $h^2$, which operates a feed rod $i^2$, Figs. 1, 13, 15, 16 and 38, and it is usually provided with a traverse screw $k^2$, to move the stud longitudinally within the hub.

This machine is calculated to have the tool cut both ways across the face of the gear, or only in one direction, as may be required. If cutting both ways the hub $g^2$ is put upon the quicker shaft $d^2$ to feed twice to each revolution of the driving gear $l$ for the tool. If cutting in one direction only the hub is put upon the slower shaft $c^2$, to feed only once to a revolution of the gear $l$.

*The feed mechanism.*—The circular toothed segment H, Figs. 1, 13, 15 and 19, is concentric with the pivot $a$ of the turret, and formed with circular T-shaped channels $l^2$, Figs. 1, 19 and 32. The base block I rests directly upon this segment and is secured thereto by bolts $m^2$, passing down into the grooves $l^2$. Tongues $n^2$, Figs. 30 and 32, of the base block project into the grooves to hold the base block in place. By loosening the bolts the base block with its superincumbent parts may be shifted longitudinally upon the segment. The base block, which is sectoral in plan, is formed with a circular T-shaped longitudinal race or cavity $o^2$, Figs. 2, 15 and 32, in its upper side; and upon the block a base plate Y rests, having a part projecting into said race $o^2$. The base block is also provided with a circular toothed rack $t^2$, as shown, in the race $o^2$ forming a part of the inner side wall of the race. A feed stand Z, Figs. 13, 14, 15 and 30, is secured rigidly to the base plate Y by clamping bolts $p^2$, and formed with a vertical central opening to receive a feed post A'. The feed post has a journal bearing in the stand, and it is formed with a collar $r^2$, occupying a cavity $s^2$, in the stand to support the post in place. Near its lower end the feed post is provided with a rigid pinion $u^2$, to engage the teeth of the rack $t^2$. The plate Y is formed with a vertical circular recess $v^2$, Figs. 2, 30 and 32, in which to receive the pinion, and a smaller recess $w^2$, to receive the lower reduced end of the post and to form a journal bearing therefor. A worm gear $x^2$, Figs. 1, 13, 15 and 30 is placed upon the post immediately above the collar $r^2$, adapted to turn independently of the post. A horizontal tangent shaft $y^2$, Figs. 15 and 38, is held in bearings $z^2$, Fig. 1, rigid with the stand Z, upon which is secured a worm $a^3$, Figs. 1 and 30, to turn the gear $x^2$. Rigid with the tangent shaft is also a ratchet $b^3$, Figs. 1 and 38. This ratchet is actuated by a pawl $c^3$ held to turn upon a simple stud fixed in a pawl carrier $d^3$, Figs. 13 and 15, adapted to turn freely upon the shaft. The feed rod $i^2$, which passes near the pawl carrier, is provided with a shiftable head $e^3$ held upon a stud $f^3$ rigid in the pawl carrier. The head turns upon the stud as with a journal bearing, and by means of it and the feed rod the feed-actuating hub $g^2$, Fig. 15, is enabled to rock the pawl carrier and so turn the ratchet and the shaft $y^2$. The pawl, shown in reverse position in Fig. 39, is formed with two unequal conical cavities $g^3$ in which a pointed detent $h^3$, Fig. 40, is urged by a spring $i^3$, said detent and spring being held in a cavity in the adjacent part of the pawl carrier. When the pawl is turned to engage the ratchet, as shown in full lines in Fig. 38, the detent enters the large cavity and by pressing against its inclined side holds the pawl against the ratchet. To throw the pawl out of action it is shifted by the attendant to the position indicated by dotted lines in Figs. 38 and 40, in which position the detent enters the small cavity and holds the pawl clear from the ratchet. The shaft $y^2$ is provided with a rigid hand wheel, $k^3$, at its extreme outer end by means of which the attendant, who stands at $A^2$, Fig. 1, may turn the worm gear independently of the actuating mechanism for said shaft. Now it will be understood that if the connection between the worm gear and feed post be such that the latter is turned by the former the base plate Y with the feed mechanism and tangent arm will be moved upon the base block on account of the pinion $u^2$ rolling along the toothed rack $t^2$ of the base block, the turret swinging accordingly. That is to say, the action of the feed serves to swing the turret and move the tool toward the work by sliding the base plate along its bearing upon the fixed base block. The worm gear and the post are caused to co-act or turn together at intervals by the following means.

The worm gear, usually made of composition, is formed with a series of fine radial teeth $o^3$, Figs. 30 and 31, in its upper side, the teeth, in practice, being cut in a ring of case-hardened iron, $l^3$, inserted rigidly in the gear. Above the gear, upon the post, is a circular tilting ring or rocker $m^3$, Fig. 36, formed with teeth $n^3$ on a portion only of the rocker to engage the teeth of the gear, as shown in Fig. 37. This rocker does not closely fit the post all round, but at two opposite sides its interior is made flaring, as shown in Figs. 30 and 36. It is held to the post by a transverse pin $p^3$, crossing the axis of the post at the middle plane of the rocker, by means of which pin and the flaring interior the rocker is permitted to tilt or rock vertically on the post as indicated by dotted lines in Fig. 30. When the rocker is horizontal its teeth engage the teeth of the worm gear and both must move together; but when in its tilted position the teeth are disengaged and the rocker and the gear move independently of each other. When the teeth of the two parts engage each other the feed is said to be "thrown in" and the tool is urged against the work.

*Means for throwing off the feed.*—When the tool has cut to the proper depth into the blank in any given case, the feed has to be automatically thrown off to arrest the progress of the tool. This is accomplished as follows: The rocker $m^3$ is formed with a laterally-extended part, in a vertical cavity in which is inserted a lifter or tilter $r^3$, Figs. 30, 31 and 36, having its lower end in contact with the worm gear, as shown. The axis of the lifter is parallel with the axis of the post, and the lifter is urged downward against the gear by a spring $s^3$, the action of which tends to tilt the rocker and throw the teeth out of engagement. Above the rocker, upon the feed post, is a feed-relief lever $t^3$, Figs. 30, 31, 33 and 35, fitted also to tilt, as indicated by dotted lines in Fig. 30, and free to move horizontally upon the post. Above the lever, upon the post is a hubbed plate $v^3$, Figs. 13, 30, 31, 33 and 34, acting as a confiner for the lever and the rocker, the plate being secured to the post by a set screw $u^3$, Fig. 1, so as to be shiftable thereon. A sufficient space is left between the lever and the confiner $v^3$ to allow the former room to tilt, as stated. The feed-relief lever is provided at its upper side with a rigid longitudinal tooth $w^3$, Figs. 30, 33, and 35, adapted normally to bear against the adjacent surface of the confiner. The surface of the confiner above the tooth is plain save as to a notch $x^3$, Fig. 34, into which the tooth may enter when, at any time, it and said notch are presented to each other. Now, when the tooth is out of the notch and bears against the surface of the confiner the lever is confined or held down to a horizontal position and in turn presses the teeth of the rocker into the teeth of the gear against the action of the spring $s^3$. But when the lever and the confiner are by any means brought relatively into positions in which the tooth may enter the notch the spring immediately lifts the rocker and clears it from the gear. Above the confiner a cap $y^3$ is screw-threaded into the upper end of the post; and the confiner is provided with a hand lever $z^3$, Figs. 1 and 15, by means of which the attendant may move the tangent arm and the tool toward or from the work. When the tooth enters the notch the feed instantly ceases for the gear being free to turn upon the post the latter is not effected by the continued action of the feed-driving mechanism.

To control the feed-relief lever so as to cause the notch to be presented to the tooth at the proper time to stop the feed, we provide a horizontal circular grooved segment $a^4$, Figs. 1, 13, 15, 49, 50 and 51, concentric with the feed post, over which the lever swings. To this segment are secured two stops $b^4$ and $c^4$, which arresting the horizontal motion of the lever in either direction, serve to control the latter.

When the tool is being fed against the work, the lever is in advance of the notch, the parts moving relatively in the directions indicated by full-line curved arrows in Fig. 31. Now when the lever encounters the stop $b^4$ its motion will be arrested but the confiner will continue to move forward and the tool continue to feed. When, however, the notch $x^3$ arrives at or overtakes the tooth the lever will suddenly rise from the action of the spring $s^3$, releasing the rocker and the worm gear, and the feed will instantly cease. That this action of the parts will be quite sudden will be clearly understood by viewing Fig. 33; for when the tooth and the notch arrive at the relative positions there shown the tooth will quickly slide into the notch and release the rocker, as stated. Now, if after the feed has been thus terminated the parts be by any means turned to move in the opposite direction (indicated by dotted arrows in Fig. 31) the lever will encounter the other stop, $c^4$, and the tooth be pushed out of the notch. This will again depress the rocker and throw the feed into action. When the parts move in the direction indicated by dotted arrows in Fig. 31, the base plate, and the feed mechanism with the tangent arm, will be moved back along the base block on account of the action of the pinion $u^2$ upon the toothed rack $t^2$, which will withdraw the tool from the work. The stops $b^4$ and $c^4$ are shiftable around the segment $a^4$, each being held to place by ordinary clamping screws $d^4$, passing through them and threaded into nuts in the groove of the segment, one of said nuts being shown at $e^4$ in Figs. 50 and 51. By shifting or adjusting these stops, the depth to which the tool will be fed into the work in any given case may be accurately determined, and likewise the distance the tool will be drawn back from the work. We prefer to make the stop $c^4$ yielding by providing a horizontal buffer $f^4$, Figs. 49 to 51 for the lever to encounter, said buffer being actuated by a spring $g^4$, back of it, as shown. The rear end of the buffer being threaded and provided with a screw nut $h^4$ enables the operator to adjust the tension of the spring at pleasure.

The feed mechanism is directly in the rear of the tangent arm and the two parts are so connected that while the arm may move vertically through short distances independently of the feed mechanism, both the latter and the arm move together in horizontal directions. The feed stand Z is formed with a horizontal rectangular cavity $i^4$, Fig. 13, near the arm, in which is closely fitted a substantially cubical block $k^4$, adapted to move laterally through short distances in a line parallel with the arm.

To the rear vertical face of the arm and over the cavity $i^4$, is rigidly secured a bracket $l^4$, Figs. 1, 13, and 15, formed with a vertical downward-projecting offset stem $m^4$, which passes into and through the block $k^4$, fitting accurately therein, but so as to move freely in a vertical direction. Now, as the block can have no lateral motion in the cavity $i^4$ in a line toward or from the arm, it follows that the latter and the feed mechanism must always move together in horizontal directions (when the tool is moved toward or from the work), but that the arm may move vertically independent of the feed mechanism.

*The pull-back mechanism.*—When the tool in any given case has been fed to the proper depth into the blank and the feed thrown off the tool must be quickly withdrawn from the blank and out of the way before the latter is indexed. The tool is withdrawn by sliding the base plate back upon the base block—the arm moving with it—which is effected as follows:

B' is a holding arm, Figs. 13, 14, 15 and 29, made rigid with the base block, to which is pivoted a bent lever C', adapted to swing in a vertical plane. The short arm of this lever is joined to the tangent arm D, or to some convenient part of the mechanism supported by the base block as, for instance, to a clamping bolt $p^2$, by a connecting bar $n^4$, as shown, the joint at either end of the bar being free to move. The long end of the lever is adapted to hold a shiftable weight D', which when unopposed serves to keep the tangent arm swung back from the work. When the tangent arm is moved toward the work by the feed mechanism it is done against the action of the weight. For instance, referring to Fig. 29, when the tool is commencing to act upon the blank, the lever C' and associated parts occupy the positions shown in full lines; but while the tool is being fed to its extreme depth into the work, the lever and associated parts are gradually moved to the positions shown by dotted lines. Now, the instant the toothed rocker of the feed mechanism is tilted to release it from the worm gear, the lever C' will be returned to the position shown by full lines in the figure, in which the cutting tool is drawn clear from the blank. To prevent the weight pulling the parts back with too violent action when the feed is thrown off, we employ a vertical dash pot E', rigid with the supporting arm B', provided with a plunger F' connected with the lever, shown in longitudinal section in Fig. 15. At the bottom of the dash pot is a pet cock $o^4$ through which air is supplied to the space below the plunger. The opening through the pet-cock being small the escape of air as the plunger descends must be gradual, on account of which the plunger will be cushioned upon the air beneath it and relieve the shock of the descending weight. By regulating the opening through the pet-cock the cushioning of the plunger may be controlled. After the tooth of the feed-relief lever enters the notch in the confiner by the lever meeting the stop $b^4$, as stated, the lever and the confiner remain engaged and move together when thrown back toward the yielding buffer by the pull-back mechanism. The device is so arranged that the weight throws the parts back sufficiently to cause the lever to sharply encounter the yielding buffer, the effect of which is to throw the tooth out of the notch and depress the lever and the rocker, which again throws the feed into action. The contiguous faces of the notch and the tooth are inclined at an angle of about forty-five degrees, which permits the tooth to slide easily out of the notch.

The operation of the feed mechanism and the pull-back mechanism is such that the former gradually moves the base plate Y with its superincumbent parts, including the tangent arm, through a given distance in one direction, and the latter moves the same parts suddenly in the opposite direction through the same distance.

*The indexing mechanism.*—After the tangent arm is thrown back by the pull-back mechanism and the tool cleared from the blank, the latter is indexed, which is done by the following means:

G', Fig. 4, is a tangent shaft for the worm gear G, Figs. 1, 3 and 9, which carries a worm H' to engage the gear.

I' is a horizontal hanger bolted rigidly to the head-stock B, and the tangent shaft rests in bearings $p^4 p^4$ therein. The shaft is formed with an enlarged overhanging part constituting a collar which, bearing against the contiguous bearing $p^4$, prevents end travel of the shaft in one direction, while set nuts $r^4$, turned against the bearing on the opposite side, prevent end travel of the shaft in the other direction.

K' is a short extension shaft for G', which, on account of the connecting parts, is practically in one piece with said shaft G'. To the shaft K', is secured a removable toothed pinion $s^4$, which is a part of a system of gearing for turning G'. A shaft, $t^4$, is held parallel with shaft G', is an extended part of the hanger I', and provided at one end with a removable overhanging gear $u^4$, which, by means of a changeable compound intermediate $v^4$, is adapted to turn the pinion $s^4$, and the shaft G'. This train of gearing with the means for holding and operating the compound intermediate is common to lathes and similar machinery. At the other end of the shaft $t^4$ is secured a gear L', which is turned indirectly by means of a pinion $w^4$, Figs. 1 and 10, held upon a shaft N', resting in a horizontal bearing in the hanger I'. The position of the shaft N' is such that its axis is in line with the axis of the tangent shaft G'. The pinion $w^4$ and gear L' are connected by means of intermediate pinions $y^4$ held by a shiftable frog $x^4$, Figs. 1, 3, and 10. This frog, which is of common construction and operation, is adapted to turn upon the shaft N' and to be set in either of two positions so as to bring one or the other of the intermediate pinions $y^4$ in mesh with the gear L' for the purpose of controlling the direction of motion of the tangent shaft G'.

The shaft N' and the whole indexing mechanism is driven by a belt on the friction pulley O', which is constructed as follows: The web of the pulley O', Fig. 3, is a thin plate formed with a hub adapted to turn freely upon the shaft N'. This web is inclosed by two circular disks $z^4$ and $a^5$, as shown, the former disk being rigid with the shaft N', and the latter disk turning with the shaft but being adapted to move longitudinally thereon. The disk $a^5$ is formed with an extended hub formed with a cavity in which is placed, upon the shaft, a spiral spring $b^5$, confined by a nut $c^5$, threaded upon the shaft and adapted to enter the cavity in the hub. The web of the pulley and the contiguous faces of the disks are formed with annular depressions opposing each other in which are placed rings $d^5$, of friction material, as leather. The disks are not in contact with the web of the pulley, but a little apart therefrom, the contact between said disks and the web being through the medium of the friction rings. The tendency of the spring $b^5$ is to press the disk $a^5$ against the web of the pulley and the latter against the rigid disk $z^4$; and by turning the nut $c^5$ one way or the other to regulate the tension of the spring the friction at the leather rings may be controlled. The tensity of the friction is maintained at all times sufficient to enable the continuously rotating pulley O' to turn the whole indexing mechanism, from which it will be understood that unopposed, the belt on said pulley would keep the blank gear continually revolving. To hold the latter while a tooth is being cut a detent for the indexing mechanism is interposed, the same being as follows: The gear L' is provided upon its inner side with rigid lugs or stops $e^5 e^5$, Figs. 11 and 12, opposing each other and near the periphery of the gear. A horizontal detent bolt $f^5$, appearing in Figs. 1 and 10 but better shown in Fig. 6, is adapted to have its free end enter between the stops $e^5 e^5$, as shown, to prevent the rotation of the gear. The bolt is held by a barrel $g^5$ rigid in the hanger I, within which is a spiral spring $h^5$ upon the bolt, pressing against the collar of the latter in a manner to force it against the gear. Thus, normally, the action of the indexing mechanism will be arrested.

To temporarily withdraw the detent bolt to release the mechanism for the purpose of indexing the blank we employ a horizontal longitudinal trip shaft $i^5$, Figs. 1, 3, 7, 9 and 20, resting in bearings in the frame beneath the head-stock. To the overhanging end of the barrel $g^5$, over the trip shaft, is rigidly secured a downwardly-extending arm $k^5$, Figs. 3 and 6, provided at its lower end with a lengthened longitudinal hub through the axis of which the trip shaft passes, as appears in Figs. 1, 7 and 9. The shaft turns freely in the hub, the latter forming a sort of a pendent bearing for the shaft. The pendent arm $k^5$ is bifurcated at its lower end including the hub, in the space between the branches of which is inserted the hub of a smaller detent-releasing arm $l^5$, provided with a spline $m^5$, Fig. 7, which rests in a longitudinal groove $n^5$, in the trip shaft, Fig. 1. By means of the groove and the spline the shaft and the releasing arm move together as to rotatory motions of the former, but the arm may freely slide longitudinally along the shaft independently of the latter. The detent bolt $f^5$, projects to some distance beyond the outer end of the barrel, and the releasing arm takes hold of this projecting part, as shown in Figs. 6 and 10. Upon each side of the releasing arm, upon the detent bolt, are placed collars $o^5$ rigid with the bolt, between which the arm may freely move but without lost motion. Now, a slight turning of the trip shaft toward the right, as appears in Figs. 3 and 7, will throw the releasing arm and the detent bolt to the positions shown by dotted lines in Fig. 6. In this position the bolt is withdrawn from between the stops $e^5$ of the gear L', which serves to temporarily release the latter and the whole indexing mechanism and allow the latter to act until the gear makes a complete revolution and is again caught by the detent bolt.

*The trip mechanism.*—The bed piece S, Figs. 1, 15, 19 and 20, is formed with a circumferential groove $r^5$, in which is fitted to slide a circular segment P' to which the turret C is rigidly bolted, so that both parts, P' and C, move together. This segment is formed with a horizontal peripheral dove-tail groove $s^5$, for holding bolts $t^5$, adapted to rigidly secure in place a downwardly-extending shiftable trip arm $u^5$, as shown. The trip shaft projects beyond the bearing $p^5$, to the overhanging end of which is rigidly secured a crank arm $v^5$, see also Figs. 21 to 23. The crank arm is provided with a pendent latch $w^5$, held in a cavity therein and adapted to swing on a pivot screw $x^5$, rigid in the crank arm. The latch is free to move toward the left, as appears in Figs. 19, 21 and 22, but encounters a shoulder $y^5$ of the crank arm when pushed toward the right. The trip arm, $u^5$, has its lower end turned inward at right angles as shown in Fig. 20, in position to engage the extreme point of the latch when the turret is turned toward the right, as appears in Fig. 19. The trip arm, when the pull-back mechanism turns the turret backward or toward the right, comes in contact with the latch, as indicated in Fig. 21, and turns the trip shaft through a small distance, or until the parts assume the positions indicated by dotted lines in Figs. 21 and 6. This turning of the shaft it will be understood, is against the action of the spring $h^5$ of the detent bolt, Fig. 6; and when the parts are in the positions shown by dotted lines in Fig. 21, the latch has swung high enough to clear the contiguous edge of the trip arm. When these relative positions of the parts are reached the spring $h^5$ will immediately cause the parts connected with the trip shaft at both ends, to assume their normal positions, as shown in full lines. The dotted positions of the parts, shown in Fig. 21, correspond with the dotted positions of the parts shown in Fig. 6; and likewise the full line positions of the parts in the two figures correspond. That is to say, when the trip arm moves the crank arm to the position shown by dotted lines in Fig. 21 the detent bolt will be withdrawn from the stops on the gear L', serving to release the latter and set the indexing mechanism in motion. The turning of the arm $v^5$ by the arm $u^5$ through the short distance indicated is but the work of a moment, but sufficiently long to release the gear L' and allow it to turn. When the latch, $w^5$, clears $u^5$, as stated, the spring $h^5$ will immediately drive the detent bolt forward against the gear, but the stop $e^5$ having then passed on on account of the rotation of the gear, the latter will make a complete revolution before being again arrested by the bolt. During this turning of the gear the bolt simply slides around against its smooth surface until the inclined end of the approaching stop is encountered, when the bolt rides up the same and springs back into the space between the stops. This again stops the gear and holds the indexing mechanism from acting. The motions of the parts are so timed that the indexing mechanism is not tripped or started until the tool has been drawn back clear of the blank, and the indexing is done while the tool is being fed toward the blank but before it reaches the latter. When the latch has cleared the trip arm as stated, and the arm $v^5$, has returned to its normal position, the trip arm will be a short distance to the right of the latch, as will appear by viewing Fig. 21. Now, as the feed again slowly turns the turret, the trip arm will be gradually moved toward the left and again encounter the latch as in a backward stroke. But the latch being free to move in that direction the crank arm $v^5$, and the trip shaft are not affected by the trip arm, the latch simply swinging out of the way as the trip arm passes. When the latter in moving toward the left reaches the position shown in Fig. 22, it will clear the latch which then assumes its normal position by gravity, ready to be encountered again by the trip arm. Two corresponding opposing stops are employed on the gear L' so that the indexing mechanism will work if turned in either direction.

*Means for adjusting the work.*—It frequently becomes necessary when using the finishing tools to adjust the work to the tool by turning the blank slightly in one direction or the other without disturbing the indexing mechanism. To provide for this adjustment we employ an adjusting cylinder R', Figs. 1, 3, 4, 5 and 9, interposed somewhere in the indexing mechanism between the shafts N', and G', preferably upon the latter or upon the shaft $t^4$. As shown this cylinder consists of a main part $z^5$, and a corresponding minor part $a^6$. The part $z^5$ is made rigid with the shaft G', and formed with an annular T-shaped groove $b^6$, in its face to receive clamping bolts $c^6$ $c^6$, as shown, the bolts being inserted through a square opening $d^6$ in the back of the piece. The bolts hold the part $a^6$, rigid with the part $z^5$, and the extreme reduced end of the shaft G′ enters $a^6$ a short distance to center the latter. The short shaft K′ is rigid in $a^6$ so that when the bolts are tightened the shaft K′ is practically a continuation of the shaft G′, both parts turning together. The periphery of the part $z^5$ adjacent to $a^6$ is divided into a scale of equal parts, as appears in Figs. 1, 3 and 8, forty divisions, more or less as may be found convenient, being employed. A single corresponding mark is formed on the adjacent part of $a^6$ as an indicator for the relative positions of the two parts. Now, as the part $z^5$ is rigid with the shaft G′, then by loosening the bolts $c^6$ said shaft may be turned independently of the part $a^6$ and all the gearing between it and the shaft N′. By this means the work may be brought exactly to the tool by turning it as may be required. After the adjustment is made the bolts are again tightened.

*The form mechanism.*—In planing gears in this machine the faces of the teeth are copied from forms as in other machines of this class. The extreme lower corner of the tangent arm is provided with a rigid but removable form rider $e^6$, Figs. 13, 15, 41, 42 and 43. This form rider inclines downward and backward in position to bear upon an inclined form S′, as shown. The form used for rough-cutting the teeth is straight and horizontal, as shown. For finishing the faces of the teeth curved forms T′ T′ are employed. These forms are held in a form holder U′ secured indirectly to the base block I of the feed mechanism. A vertical grooved body V′ is secured rigidly to the base block by a screw $f^6$, in which body is fitted a slide W′ adapted to move vertically. The slide is formed with a projecting inclined part X′ against which the form holder is held upon a stud $g^6$, rigid in the slide. A clamping nut $h^6$ secures the form holder rigidly in place, and by loosening which the holder may be turned to bring either form into action as may be required. A detent of some simple kind is employed to accurately set the form holder in each of its positions of adjustment.

For vertically adjusting the forms a lifting screw $i^6$, Figs. 44 and 45, is employed threaded in a bearing in the part V′ in position to bear upward against a part of the slide. This lifting screw is provided with a set nut $k^6$ to hold it in place after adjusting the form. The body V′ overhangs and partly covers the teeth $l^6$ of the segment H, and it is provided with a pinion Y′ upon a vertical shaft $m^6$ turning in bearings in V′, Figs. 13, 15, 41, 42, and 44, the pinion being in position to engage the teeth $l^6$. The shaft $m^6$ is squared at $n^6$ to receive a wrench for turning it for the purpose of moving the base block I around upon the segment, the holding bolts $m^2$ being first loosened. When thus shifting the base block, the feed mechanism, the tangent arm, the pull-back mechanism, and the form-holding mechanism go with it, all these parts being secured to or carried by the base block. This shifting of the base block with its dependent parts is for the purpose of adapting the machine for planing gears of different diameters and bevel.

The head-stock B is adapted to be moved longitudinally upon the frame by a horizontal traverse screw Z′, Figs. 1 and 3, beneath it. This screw rests in a bearing $o^6$, in the frame, and is operated by an overhanging crank.

As the machine is constructed the indexing mechanism is at one end, and the trip mechanism at the other end of the frame.

What we claim as our invention is—

1. A gear planer provided with an indexing mechanism and a detent or stop for said mechanism, in combination with a pivotal turret, an arm carrying the cutting tool held by the turret, and means to give the turret a retrograde motion and actuate said detent or stop, substantially as shown and described.

2. A gear planer provided with an indexing mechanism, in combination with a pivotal turret, an arm carrying the cutting tool, held by the turret, mechanism to turn the turret to move the tool backward, a detent for the indexing mechanism, and a trip arm carried by the turret to actuate the detent, substantially as shown and described.

3. A gear planer having an indexing mechanism and a detent therefor, in combination with a pivotal turret, an arm carrying the cutting tool, held by the turret, a feed mechanism to turn the turret in one direction, a pull-back mechanism to turn the turret in an opposite direction, and a trip for the detent operated by the pull-back mechanism, substantially as shown and described.

4. An automatic gear planer having an indexing mechanism and a detent therefor, in combination with a continuously-rotating friction wheel to drive the indexing mechanism, and means to operate the detent, substantially as shown and described.

5. An automatic gear planer having an indexing mechanism consisting of a driving shaft and a worm and intermediate gearing connecting said shaft and worm, an adjuster for the work interposed between said shaft and the worm and connected with both by said intermediate gearing, said adjuster consisting of two parts joined, one part adapted to turn the worm and the other part adapted to be turned by the shaft, said parts of the adjuster being adapted to be turned independently of each other, substantially as shown and described.

6. An automatic gear planer comprising an indexing mechanism having a rotatory gear L′ provided with a stop, a spring-pressed bolt adapted to engage said stop, a shaft adjacent to said gear, and an arm on the shaft adapted to operate said spring-pressed bolt, and means to turn the shaft, substantially as shown and described.

7. An automatic gear planer comprising an indexing mechanism having a rotatory gear L' provided with a stop, a spring-pressed bolt adapted to engage said stop, a shaft adjacent to the gear, and an arm on the shaft adapted to operate said bolt, and means to turn the shaft, said arm being adapted to turn with the shaft but to slide longitudinally thereon, substantially as and for the purpose specified.

8. An automatic gear planer having a turret or body C supporting parallel shafts $d^2$ and $c^2$ connected by gearing adapted to cause them to turn with unequal velocities, a crank arm adapted to be placed upon either shaft, and means to rotate said shafts, substantially as shown and set forth.

9. A gear planer having a frame, a pivotal turret supported by the frame, a tool-carrying arm held by the turret, a horizontal base block adapted to be made rigid relative to the frame, a base plate adapted to slide upon the base block, a feed mechanism controlling the tool-carrying arm, rigid with the base plate, a weighted lever connected with the base block and with the parts supported by the latter, the feed mechanism serving to move the parts upon the base block in one direction and the weighted lever adapted to move said parts in the opposite direction, substantially as shown and described.

10. A gear planer having a frame, a horizontal toothed segment rigid with the frame, a shiftable base block held by the segment, a feed mechanism held by the base block, a tool-carrying arm controlled by the feed mechanism, a toothed pinion held in bearings beneath said arm rigid with the base block adapted to engage the teeth of the segment, said pinion being adapted to move the base block with its superincumbent parts along the segment, substantially as shown and described.

11. A gear planer having a pivotal turret and a rigid base block, in combination with a feed mechanism held by the base block, a tool-carrying arm held by the turret and controlled by the feed mechanism, the base block being formed with a series of gear teeth, the feed mechanism having a vertical rotatory post, a pinion on the post to engage the teeth of the base block, and means to turn the post, substantially as shown and described.

12. A gear planer having a toothed base block and a base plate adapted to slide thereon, in combination with a feed stand rigid with the base plate, a rotatory post held by the stand, a pinion on the post to co-act with the base block, a toothed worm gear on the post, a toothed rocker held to turn with the post and adapted to engage the worm gear, a tilter for the rocker, a toothed relief lever on the post co-acting with the rocker, a notched plate over the lever rigid with the post, and a stop or actuator for said lever, and means to turn the worm gear, substantially as shown and described.

13. A gear planer having an indexing mechanism, a feed mechanism, a tool-carrying arm controlled by the feed mechanism, a pull-back mechanism for the arm, a detent for the indexing mechanism, and a trip for the detent operated by the pull-back mechanism, the latter acting upon the arm in advance of the action of the indexing mechanism, substantially as shown and described.

14. A gear planer having a pivotal turret, a tool-carrying arm held by the turret, a stationary base block, a feed mechanism held movably upon the base block and controlling said arm, a weighted lever connected with the base block and with the mechanism upon the latter, and a dash pot or buffer for the lever, substantially as and for the purpose specified.

15. A gear planer having a pivotal turret, a shaft $c^2$ held by the turret, a crank arm on the shaft, a tool-carrying arm held by the turret, a tool-carrying reciprocating slide in said arm, and an adjustable connecting bar for said crank arm and the tool-carrying slide, and means to turn the crank arm, substantially as shown and described.

16. An automatic gear planer having a frame and an indexing mechanism supported thereby, a detent for the indexing mechanism, a pivotal turret supported by the frame, an actuator for the detent controlled by the turret, said actuator being at one end of the frame and the indexing mechanism at the opposite end of the frame, with a shaft to connect the actuator and the indexing mechanism, substantially as shown and described.

17. A gear planer having a toothed base block, in combination with a feed stand supported by the base block, a rotatory post in the feed stand, a pinion on the post to co-act with the base block, a worm gear on the post, a rocker held by the post to turn therewith and adapted to engage the worm gear, a tilter for the rocker, a toothed relief lever over the rocker, a notched plate rigid with the post co-acting with the lever, a yielding stop for the lever, and means to turn the latter against said stop, substantially as shown and described.

In witness whereof we have hereunto set our hands, this 14th day of November, 1893, in the presence of two subscribing witnesses.

WILLIAM GLEASON.
JAMES E. GLEASON.

Witnesses:
ENOS B. WHITMORE,
M. L. WINSTON.